US010066600B2

(12) United States Patent
Brekenfeld

(10) Patent No.: US 10,066,600 B2
(45) Date of Patent: Sep. 4, 2018

(54) WIND TURBINE ROTOR BLADE AND METHOD OF CONSTRUCTION

(71) Applicant: TPI Composites, Inc., Warren, RI (US)

(72) Inventor: Zachary Brekenfeld, East Greenwich, RI (US)

(73) Assignee: TPI COMPOSITES, INC., Warren, RI (US)

( * ) Notice: Subject to any disclaimer, the term of this patent is extended or adjusted under 35 U.S.C. 154(b) by 308 days.

(21) Appl. No.: 14/687,420

(22) Filed: Apr. 15, 2015

(65) Prior Publication Data

US 2015/0316028 A1 Nov. 5, 2015

Related U.S. Application Data

(60) Provisional application No. 61/986,922, filed on May 1, 2014.

(51) Int. Cl.
| | |
|---|---|
| *F03D 1/06* | (2006.01) |
| *F03D 13/10* | (2016.01) |
| *B29D 99/00* | (2010.01) |
| *B29C 70/34* | (2006.01) |
| *B29L 31/08* | (2006.01) |

(52) U.S. Cl.
CPC ............ *F03D 1/0675* (2013.01); *B29C 70/34* (2013.01); *B29D 99/0028* (2013.01); *F03D 13/10* (2016.05); *B29L 2031/085* (2013.01); *Y02E 10/721* (2013.01); *Y10T 156/1002* (2015.01)

(58) Field of Classification Search
CPC ....... F03D 1/0675; F03D 3/062; B29C 70/34; B29D 99/0028; B29L 2031/085

USPC ............... 416/226; 29/889.7, 889.71, 889.72
See application file for complete search history.

(56) References Cited

U.S. PATENT DOCUMENTS

| | | | |
|---|---|---|---|
| 7,179,059 B2* | 2/2007 | Sorensen | F03D 1/0675 416/226 |
| 8,043,065 B2 | 10/2011 | Kyriakides | |
| 8,043,067 B2* | 10/2011 | Kuroiwa | F03D 1/0675 416/223 R |
| 8,171,633 B2 | 5/2012 | Zirin et al. | |
| 8,192,169 B2 | 6/2012 | Piasecki | |
| 8,250,761 B2 | 8/2012 | Tobin | |
| 8,257,048 B2* | 9/2012 | Yarbrough | F03D 1/065 244/123.8 |
| 8,449,259 B1 | 5/2013 | Kaser | |
| 8,556,590 B2 | 10/2013 | Esaki et al. | |
| 2010/0135817 A1* | 6/2010 | Wirt | F03D 1/0675 416/226 |
| 2014/0166208 A1* | 6/2014 | Schubiger | B29C 66/721 156/468 |

(Continued)

*Primary Examiner* — Igor Kershteyn
*Assistant Examiner* — Eric Zamora Alvarez
(74) *Attorney, Agent, or Firm* — Stephen Kenny; Foley Hoag LLP

(57) ABSTRACT

A wind turbine rotor blade is bonded together at the leading and trailing edges, and including a shear web or webs (the main vertical stiffening member that runs the span of the rotor blade) as an integral part, sharing the inner and outer skins of one or both sides of the blade. The integrated shear web(s) is made into the skin shell, and is an uninterrupted, continuous extension of the shell laminate that is joined to the shell component/components without requiring a secondary bond of any sort. The laminates in the shell and the shear web(s) may differ or be the same.

15 Claims, 19 Drawing Sheets

(56) References Cited

U.S. PATENT DOCUMENTS

2014/0301859 A1* 10/2014 Hancock ............... F03D 1/0675
416/230

* cited by examiner

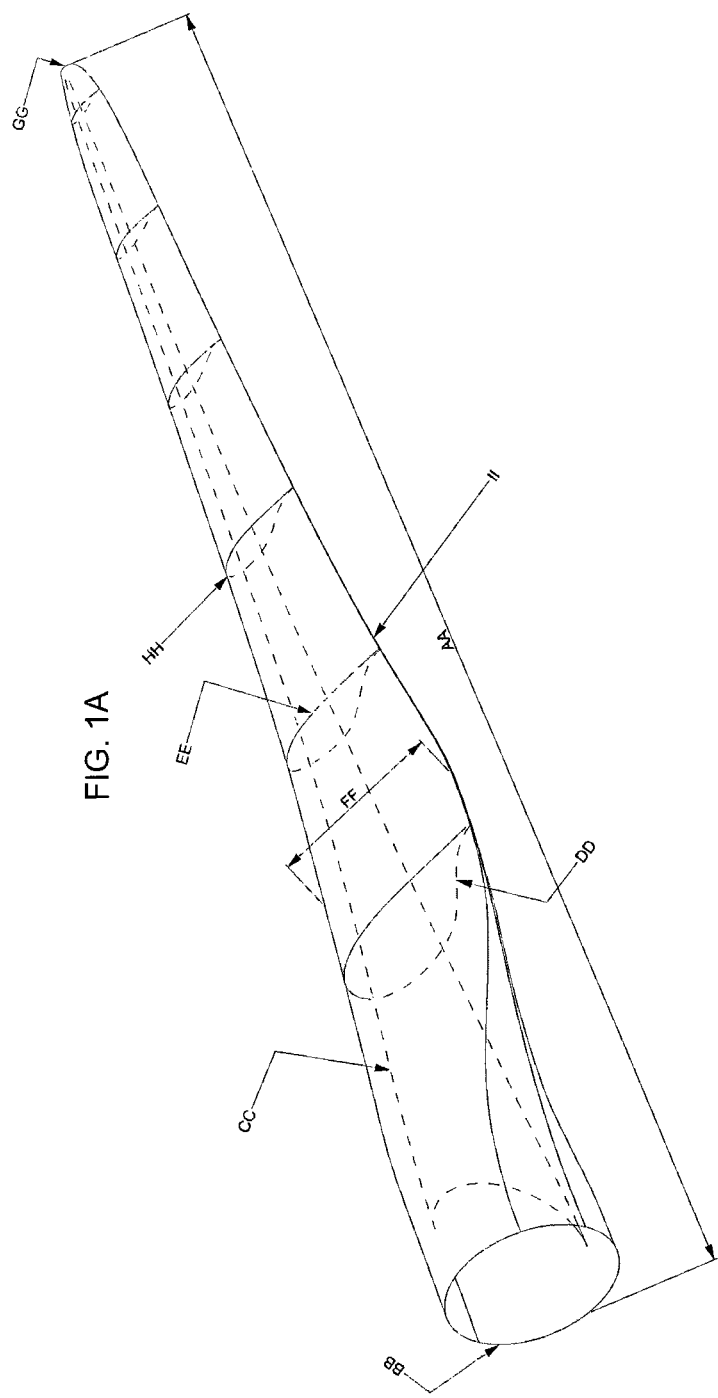

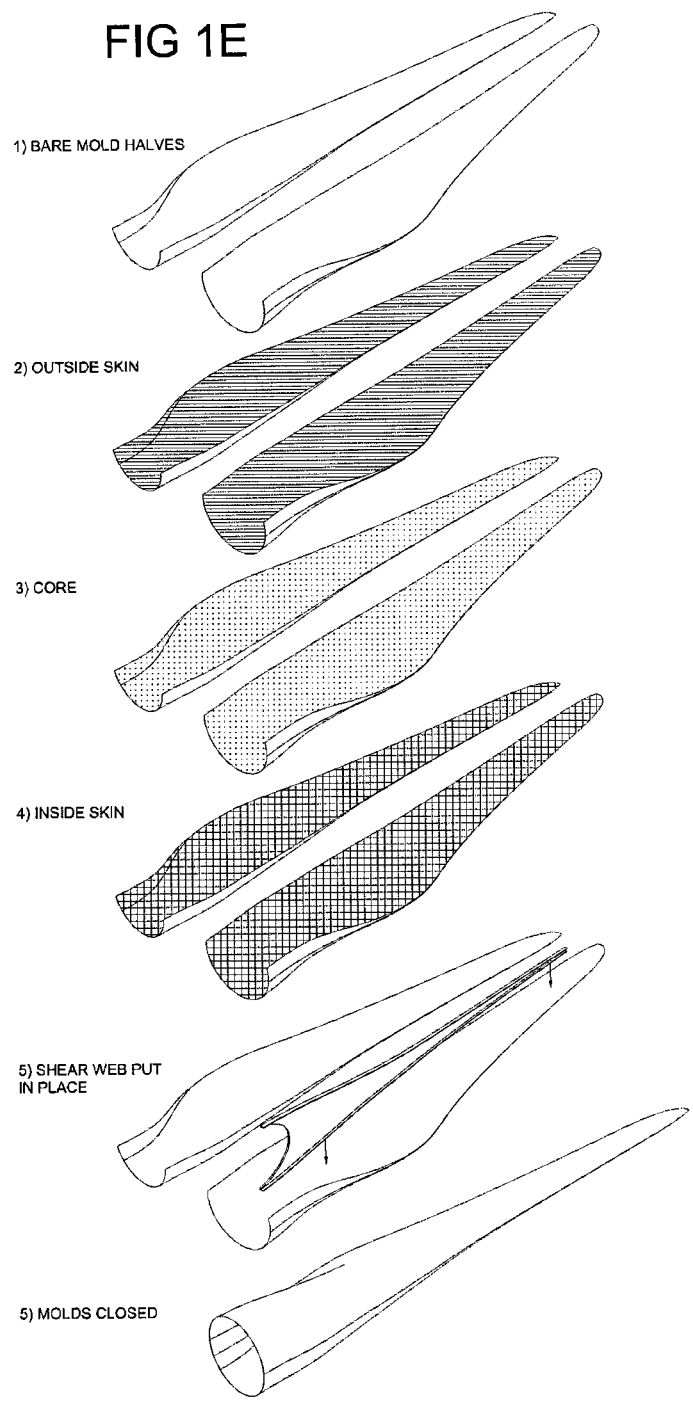

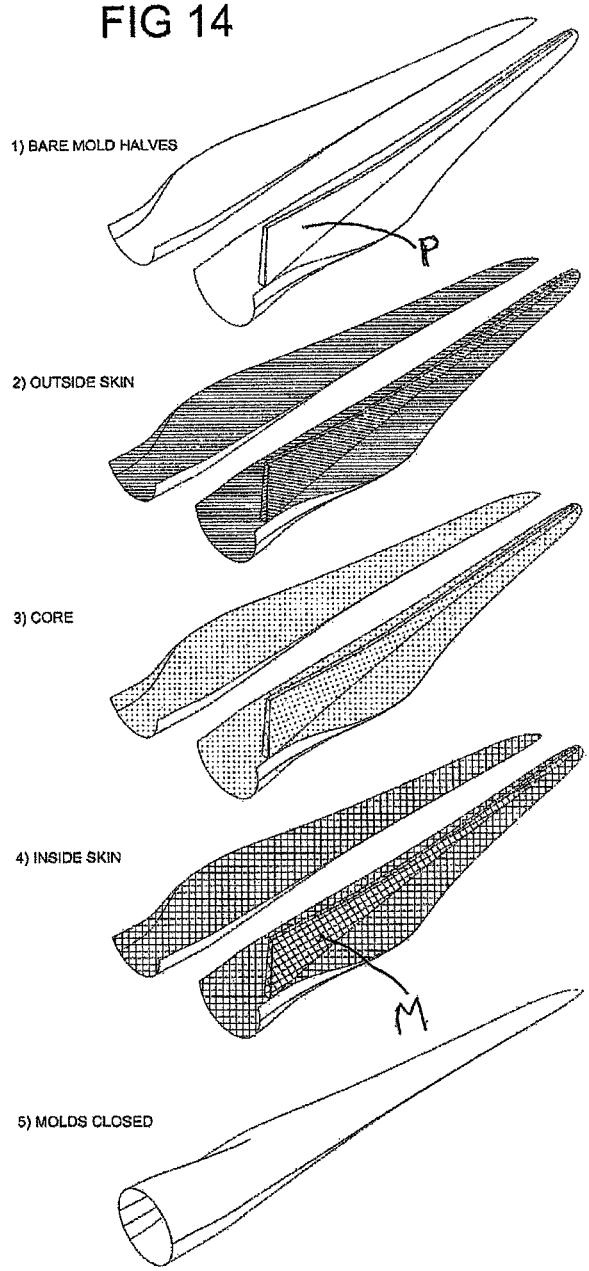

WIND TURBINE ROTOR BLADE AND METHOD OF CONSTRUCTION

RELATED CASES

Priority for this application is hereby claimed under 35 U.S.C. § 119(e) to commonly owned and U.S. Provisional Patent Application No. 61/986,922 which was filed on May 1, 2014 and which is incorporated by reference herein in its entirety.

FIELD OF THE INVENTION

The present invention relates generally to an improved design and manufacturing process for wind turbine blades. More particularly, the present invention relates to an improved wind turbine blade construction and associated method of construction of the wind turbine blade particularly at the interface of the shear web or webs with the blade shell surfaces.

DISCUSSION OF THE RELATED PRIOR ART

Current accepted manufacturing methods of wind turbine blades separates the process into four general phases. Depending on the size of the blade and the laminate schedule (structural composition) the manufacturing process may be separated into four or more phases. In connection with the known blade fabrication techniques these mean phases may be described as follows:

Phase 1) Layup of the Skin Laminate

The laying up of the skin laminates occurs first, and sets foundation for the aerodynamic surfaces and mounting area (root) for the turbine blade. The skin laminate is broken up into two separate sides of the blade: (HP), and (LP). Much like a common air foil found on airplanes, the (LP) side has the loss of pressure associated with lift that pulls the blade forward, while the (HP) side retains positive pressure and aids in generating the vortices that generate lift. (HP) and (LP) skin laminates are typically laid up simultaneously, but in separate molds.

Phase 2) Layup of Shear Web(s)

The main structural component of a wind turbine blade is a large spar or spars that run the span (length) of the blade, connecting the (HP) and (LP) skins, creating an internal "I" beam. These spars are typically referred to as shear web(s), given their structural function within the blade. They absorb and transmit shear forces from the loaded skins. The fabrication of the shear web(s) requires separate tooling. The shear web(s) are typically fabricated simultaneously to the skin laminates, but are unto themselves a separate piece, requiring all the attention and controls that the skin laminates require.

Phase 3) Positioning and Bonding the Shear Web(s) to the Skin Laminate

This phase is fundamentally the same for small blades (less than 20 m in length) as it is for larger blades (20 m or more). However for larger blades phase 3 is much more time consuming and usually requires heavy machinery in which to move the shear web(s) from its mold to the skin mold, as well as large complex fixtures in which to locate, hold, and support the shear web(s) while the bonding material sets. Should the shear web(s) lie outside the tolerance for their position the blade will fail when in use. For this reason locating these structural members within the blade is critical. It is common practice to include the use of exotic methods to ensure this is done correctly. Once the shear web(s) are positioned within the skin mold it can be permanently bonded in place.

Phase 4) Closing of the Skin Molds, and Final Bonding

The LP and HP skin molds are typically laid side by side with a hinge joining them. Once the shear web(s) bond has cured, the HP side (typically) is closed over the LP side, and the two are permanently bonded. This completes the initial production phases of the wind turbine blade.

The wind turbine rotor blade is subject to a multitude of stresses during its lifetime, so much so that the current bond in shear web(s) construction techniques (explained above) is not a wholly satisfactory solution. In addition to the amount of time required to fabricate, current techniques allow for a greater chance of manufacturing error to affect the structural cohesiveness of the overall rotor blade. Failure of a rotor blade typically occurs at the interface between bonded surfaces. These failures can often be catastrophic, especially if the turbine is in use, resulting in damage to other rotor blades, and the tower itself. In accordance with the present invention there has been a realization that, if a rotor blade has less of these bonded surfaces, the risk of failure is substantially mitigated.

SUMMARY OF THE INVENTION

In light of the described processes in the background herein, the present invention provides a novel construction and associated method that reduces the amount of time and resources in which to complete a wind turbine blade, with a reduced incidence of manufacturing error.

The technique of the present invention also increases the structural cohesiveness within the blade itself by having the main structural component integral with the shell laminates of one or both sides. By having the shear web(s) integral with the skin, better shear properties are attained. This allows for better strength yields, and increased cyclical fatigue resistance. These attributes leads to lighter laminate schedules for future blades, decreasing the weight of the blade per length. A lighter blade also has a lower start speed, and is able to operate through a wider margin of wind speeds. A lighter rotor blade also means a lighter completed assembly, including operating machinery, and a lighter tower structure.

In accordance with the present invention there is provided a wind turbine rotor blade that is constructed in the form of an airfoil shape, and comprised of one pressure member and another pressure member that together are interconnected to form the airfoil shape, along with a shear web member that is constructed and arranged to span across the pressure members. The shear web member has opposite respective one and other ends. A one end of the shear web member, including at least one spar cap, is integrally formed with the one pressure member at a location therealong. The other end of the shear web member includes a bonding flange for securing the other end of the shear web member to the other pressure member at a location therealong. In other embodiments described herein the shear web member is integrally formed with both pressure members or shells.

In accordance with another aspect of the present invention there is provided a method of manufacturing a wind turbine rotor blade that is constructed in the form of an airfoil shape. The method comprises, providing a two part mold, providing a first pressure member having a partial air foil shape and for disposition in one part of the mold, providing a second pressure member that also has a partial air foil shape and for disposition in another part of the mold, providing a shear web member having one and other ends and meant to bridge across the pressure members spanning a length of the pressure members, and forming the one end of the shear web member integrally with an inner surface of at least the one pressure member, the other end of the shear web member having a bonding flange for securing the other end of the shear web member to the other pressure member when the mold is closed.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which:

FIG. 1A presents a perspective view of a typical rotor blade, with various typical parts labeled;

FIG. 1E is a sequential perspective diagram for illustrating the typical production steps in constructing a turbine;

FIG. 14 presents the production steps in constructing the integrated shear web turbine in accordance with the concepts of the present invention. In this series of drawings each phase of construction is illustrated. First, and with reference to FIG. 2, the outer skins (1,17) is laid into the molds, followed by the core (4,7,15,12), then the inner skins (5,8,11,16). The laminates (skins and core) are then allowed to cure (if hand laid with wet material either prepreg or hand wetting) or infused. The mold halves are then closed and bonded together with the shear web(s). This sequence is for an embodiment wherein the shear web is only integral with one of the shells.

DETAILED DESCRIPTION

In accordance with the present invention, rather than using bonding of the shear web member at both ends with the blade shell, there is provided a novel construction and associated method that reduces the amount of time and resources in which to complete a wind turbine blade, with a reduced incidence of manufacturing error. The technique of the present invention also increases the structural cohesiveness within the blade itself by having the main structural component (shear web member or members) integral with the shell laminates of one or both sides of the shell (pressure member). By having the shear web(s) integral with the skin, better shear properties are attained. This allows for better strength yields, and increase cyclical fatigue resistance. These attributes leads to lighter laminate schedules for future blades, decreasing the weight of the blade per length. A lighter blade also has a lower start speed, and is able to operate through a wider margin of wind speeds. A lighter rotor blade also means a lighter completed assembly, including operating machinery, and a lighter tower structure.

The concept of the present invention involves providing an integral forming of at least one end of the shear web member with one of the pressure members or shells. In this way there is a stronger bond at least where the web member is integrally formed with a pressure member (shell). In one embodiment illustrated herein the web member is integrally formed with both of the pressure members providing an even stronger blade construction.

FIG. 1A presents a typical rotor blade. A rotor blade works as an airfoil by generating lift on the (LP) side EE, while maintaining positive pressure on the (HP) side DD. The main structural component holding the (LP) side EE to the (HP) side DD is the shear web(s) CC. The shear web(s) CC acts as the web(s) in an "I" beam, connecting the opposite sides, transmitting shear forces from one side to the other when the blade bends along its span AA or twists along its chord FF. The rotor blade has a leading edge HH, which faces the direction of travel through the air stream, and a trailing edge II, which faces opposite the direction of travel. The part of the rotor blade that attaches to the hub is the root BB, and the end opposite is the tip GG. Refer to the list of components and associated reference numbers that are set forth hereinafter.

Figure 1B:
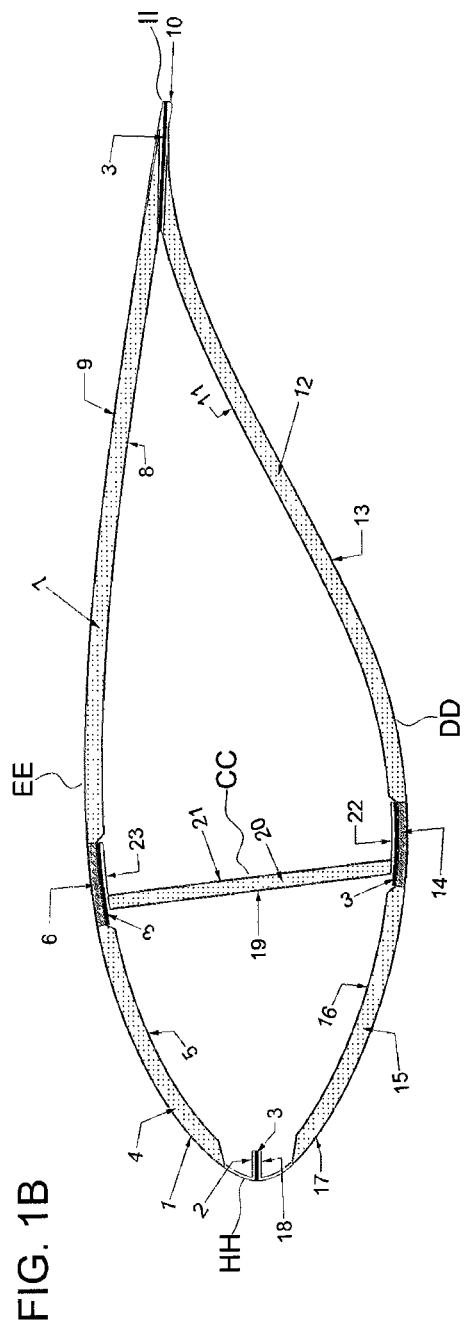
FIG. 1B presents a section view across the chord of a typical rotor blade assembly with a single shear web(s)

FIG. 1B presents a section view across the chord of a typical rotor blade assembly with a single shear web(s). A rotor blade of less than 40 meters span AA may have this layout. The (LP) side and (HP) side are bonded together at 3 with a single shear web(s) CC. The (LP) side EE, is made up of a leading edge HH and a trailing edge II. The (LP) and (HP) shells are preferably cored construction with inner skins (5, 8, 16, 11) and outer skins (1, 9, 17, 13) encapsulating a structural foam or balsa core (4, 7, 15, 12). Where the cored composition terminates at the leading and trailing edges of the rotor, a bonding flange (2, 18, 10) is created where an adhesive is applied to permanently affix the components of the rotor blade together. The shear web(s) is also comprised of a cored construction 20, with an inner and outer skin (19, 21). Where the core terminates, a bonding flange is created on the (LP) and (HP) sides (22, 23). The shear web(s) is bonded at 3 to the shell (EE,DD) by way of the spar caps (6,14) at the interface of these flanges (22,23). The shear web(s) CC, coupled with the spar caps (6,14) create the structural "I" beam within the rotor blade. In FIG. 1B it is noted that the shear web is not integrally formed with either shell but is secured by bonding with the shells.

Figure 1C:
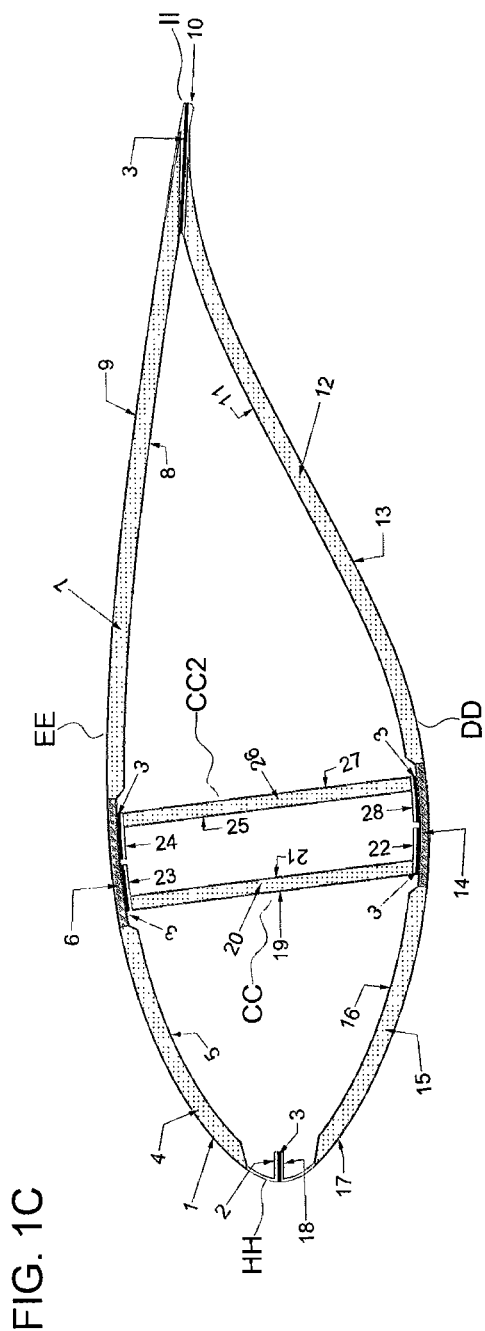
FIG. 1C presents a section view across the chord of a typical rotor blade assembly with two main shear webs.

FIG. 1C presents a section view across the chord of a typical rotor blade assembly with two main shear web(s)s CC and CC2. This arrangement is typical for rotors of 40 meters or more in span AA, but whose max chord length FF is relatively narrow. All components are the same as those mentioned above for FIG. 1B, except for the addition of a second shear web(s) CC2 that is aligned closer to the trailing edge II side of the rotor. The trailing edge shear web(s) is constructed of a cored construction, comprising an inner skin, core, and outer skin (25, 26, 27). Where the core (26) terminates, the inner and outer skins (25, 27) create bonding flanges (28, 24) to which the shear web(s) is bonded to the rest of the rotor, by way of the spar caps (14, 6).

Figure 1D:
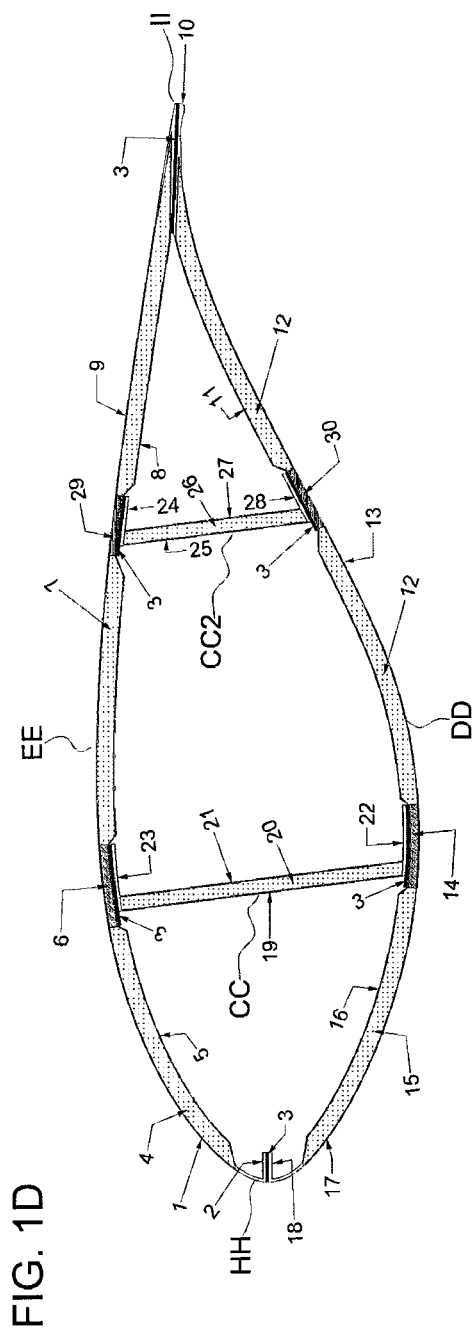
FIG. 1D presents a section view across the chord of a typical rotor blade assembly with both a main shear web and a secondary shear web.

FIG. 1D presents a section view across the chord of a typical rotor blade assembly with a main and a secondary shear web(s). This arrangement is typical for a rotor of 40 meters or more in span AA, but whose max chord length FF is relatively broad. All components are the same as those mentioned above in FIG. 1C except that the second shear web(s) CC2 has been moved further along the chord FF toward the trailing edge II, and two spar caps have been added to compensate the new position (29, 30).

FIG. 1E presents typical production steps in constructing a wind turbine blade. In this series of drawings each phase of construction is illustrated. First the outer skins (1,17) is laid into the molds (halves), followed by the core (4,7,15, 12), then the inner skins (5,8,11,16). The laminates are then allowed to cure (if hand laid with wet material either prepreg or hand wetting) or infused. Once the skins are set, the shear web(s) CC is bonded into place using a structural adhesive. The mold halves are then closed and bonded together with the shear web(s).

Figure 2:
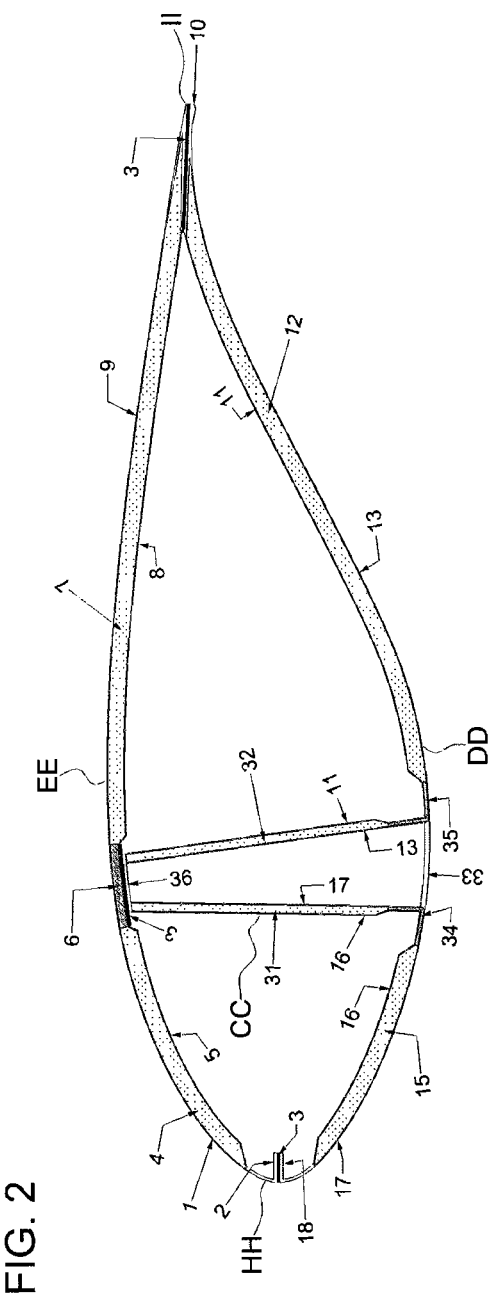
FIG. 2 presents a section view across the chord of a wind turbine blade in accordance with the present invention and described herein whereby the single shear web is integral with the shell and the spar cap on the (HP) side.
Figure 2A:
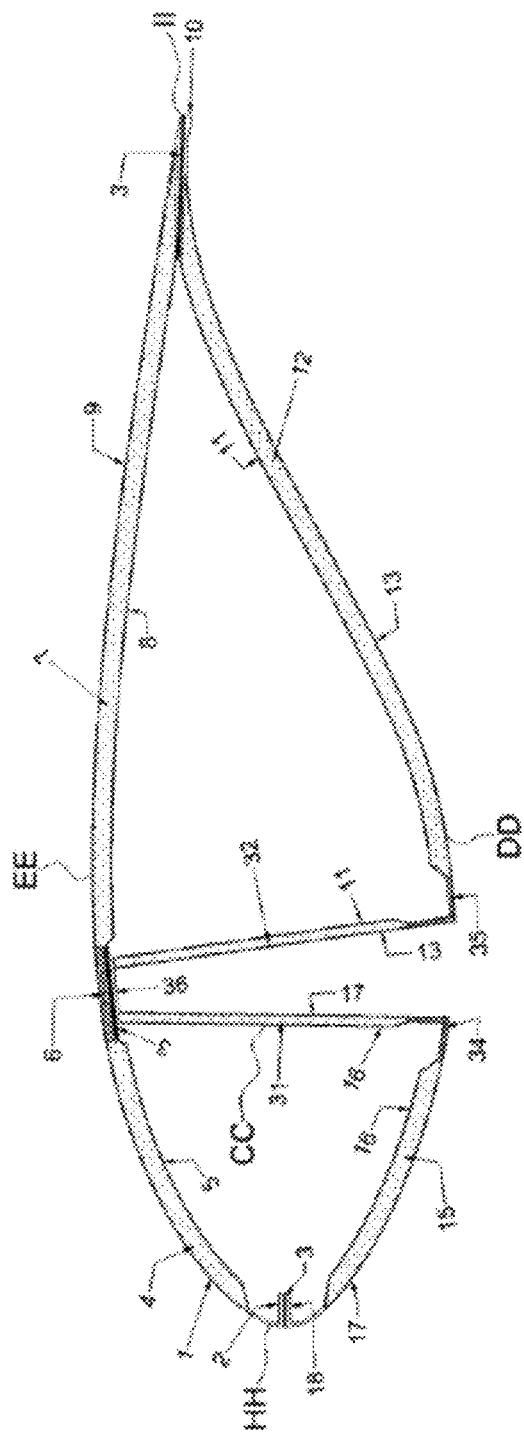
FIG. 2A presents a section view, depicting an opening in the shell, across the chord of a wind turbine blade in accordance with the present invention and described herein whereby the single shear web is integral with the shell and the spar cap on the (HP) side.

FIG. 2 presents a section view across the chord of a wind turbine blade that is constructed in accordance with the invention described herein whereby the single shear web(s) CC is integral sharing the inner and outer skins (16, 11, 13, 17) on the (HP) side with the spar cap (34, 35) made integral to the same. The shear web(s) CC needs to be made in such a way that it can be pulled off a mold and present a seamless surface. To do this the shear web(s) CC will need to be 3 sided, tapering towards the opposite end of the opening. The opening may or may not need a capping plate 33 depending on the size of the opening and the aerodynamic needs of the rotor blade. Depending on the structural needs of the rotor blade any side can be cored construction (31, 32) or single skin 36. Where the 2 sides of the shear web(s) CC meet a bonding flange 36 is formed, to which the (HP) side DD with shear web(s) is bonded at 3 to the (LP) side EE.

Figure 3:
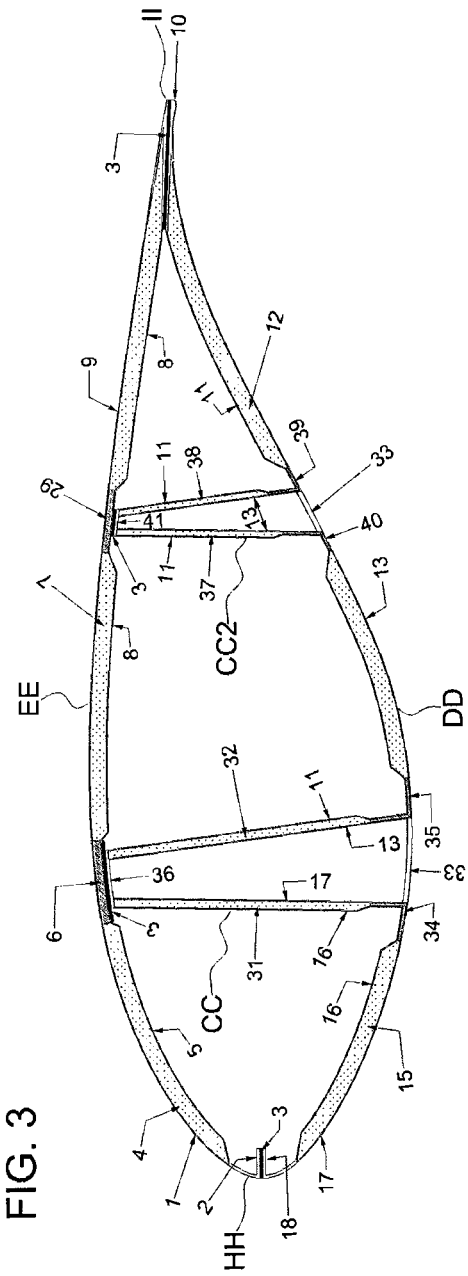
FIG. 3 presents a section view across the chord of another embodiment of the present invention described herein whereby a main shear web(s) and a secondary shear web(s) have been integrated into the shell of the rotor blade as well as the spar caps on the (HP) side.

FIG. 3 presents the section view across the chord of another version of the present invention described herein whereby the main shear web(s) CC and the secondary shear web(s) CC2 have been integrated into the shell of the rotor blade as well as the spar caps (34, 35, 39, 40) on the (HP) side DD. All components are the same as those mentioned above in FIG. 2 except that there is a secondary shear web(s) CC2 with its corresponding spar caps (29, 39, 40). The secondary shear web(s) CC2 is the smaller of the two, located closer to the trailing edge along the chord of the rotor blade. Like the main shear web(s) CC the secondary shear web(s) CC2 will be 3 sided tapering towards the opposite end of its opening which may be capped at 33 or left open depending on the aerodynamic needs of the rotor blade. Depending on the structural needs of the rotor blade any side (shear web) can be cored (37, 38) or single skin 41. As with the main shear web(s) CC the secondary shear web(s) CC2 shares the same inner and outer skin as that of the (HP) side (11, 13). Where the two sides of the secondary shear web(s) CC2 meet a bonding flange 41 is formed to which it is bonded at 3 to the (LP) side EE.

Figure 4:
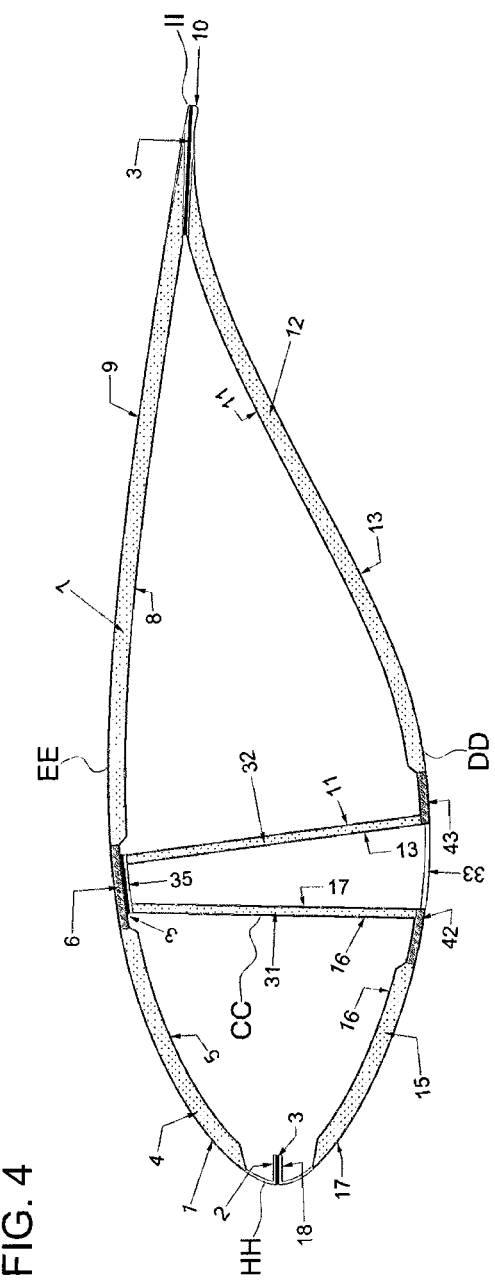
FIG. 4 presents a section view across the chord of still another embodiment of the present invention described herein whereby the single shear web(s) is integral with the shell and the spar cap on the (HP) side, and has been prefabricated and added to the shell of the rotor blade during construction.

FIG. 4 presents the section view across the chord of still another embodiment of the present invention described herein whereby the single shear web(s) is integral with the shell and the spar caps (42, 43) on the (HP) side has been prefabricated and added to the shell of the rotor blade during construction. This technique may be used for larger rotor blades. The main shear web(s) CC is integrated in the same manner as described in FIG. 2 and FIG. 3.

FIG. 5 presents the section view across the chord of another version of the present invention described herein whereby the main shear web(s) CC and the secondary shear web(s) CC2 have been integrated into the shell of the rotor blade while the spar caps (42, 43, 44, 45) on the (HP) DD side have been prefabricated and added in during construction, as described above in FIG. 5.

Figure 5:
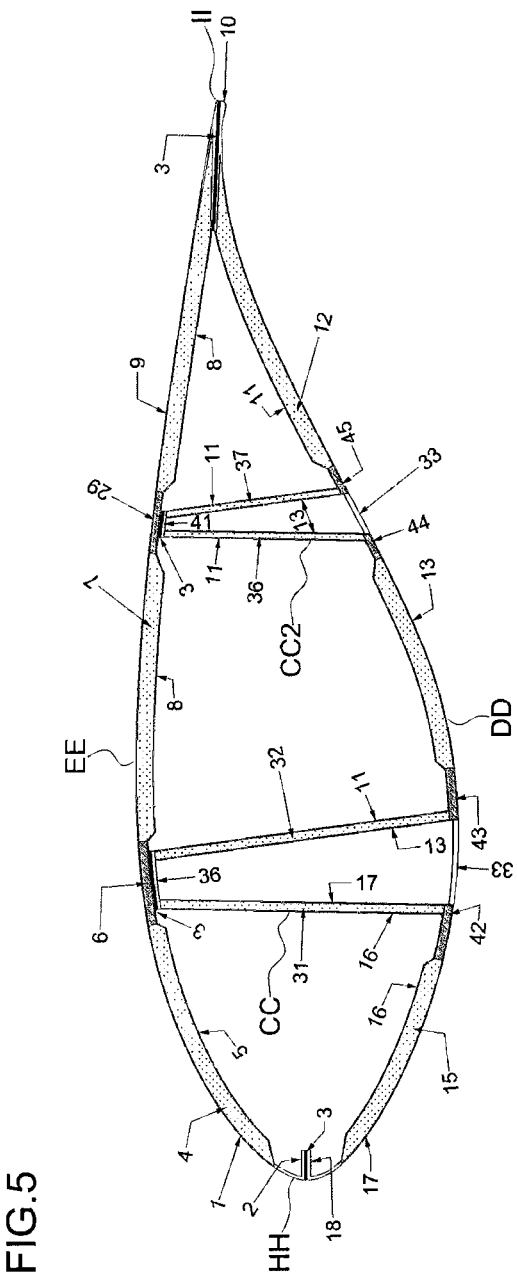
FIG. 5 presents a section view across the chord of still a further embodiment of the present invention described herein whereby a main shear web(s) and a secondary shear web(s) have been integrated into the shell of the rotor blade while the spar caps have been prefabricated and added in during construction.
Figure 6:
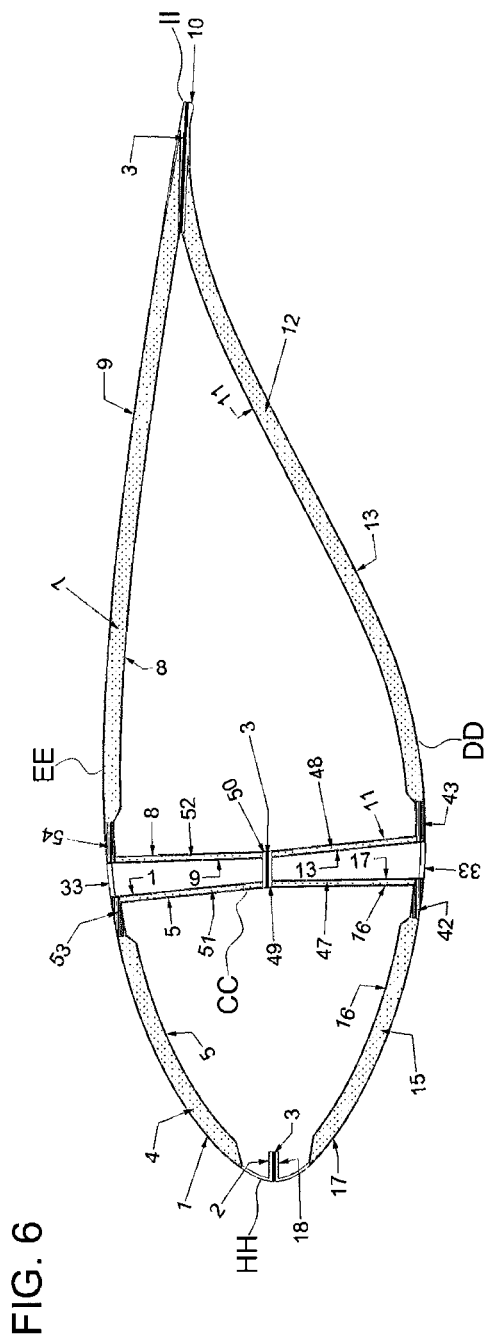
FIG. 6 presents a section view across the chord of another embodiment of the present invention described herein whereby the main shear web(s) is integral with both sides of the rotor blade shell.

FIG. 6 presents the section view across the chord of a further embodiment of the present invention described herein whereby the main shear web(s) CC is integral with both sides DD, EE of the rotor blade shell, and bonded at 3 where their bonding flanges (49, 50) meet. Depending on the structural needs of the rotor blade all sides can be cored (47, 48, 51, 52) or single skin (49, 50) As mentioned in FIG. 2, FIG. 3, FIG. 4, and FIG. 5, the shear web(s) CC will share common geometric qualities in that each will have 3 sides, and taper opposite the opening, forming a bonding flange (49, 50) at its apex. The opening may be open or capped 33 depending on the aerodynamic needs of the rotor blade. The (LP) spar cap (53, 54) has been altered to allow the shear web(s) to be made integral with the (LP) side EE. By having the shear web(s) CC integrated into the skin of both sides, the bonding flange is moved to the neutral axis (49, 50) of the shear web(s). The neutral axis of the shear web(s) experiences less stress forces and is better suited for a secondary mechanical bond.

Figure 7:
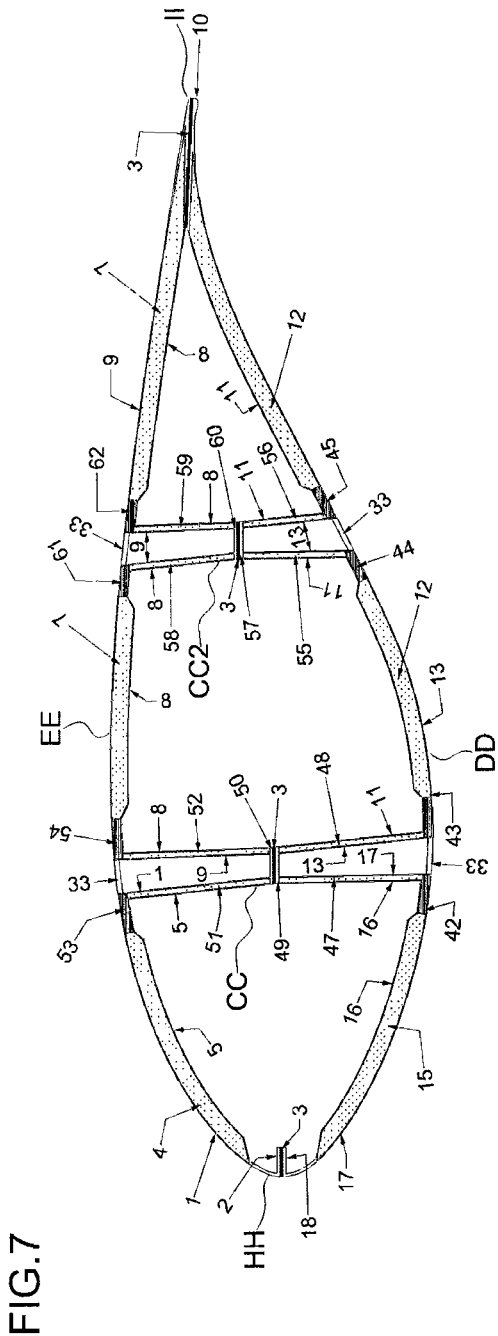
FIG. 7 presents a section view across the chord of still another embodiment of the invention described herein whereby the main shear web(s) and secondary shear web(s) are integral with both sides of the rotor blade shell.

FIG. 7 presents the section view across the chord of another version of the present invention described herein whereby the main shear web(s) CC and secondary shear web(s) CC2 are integral with both sides DD, EE of the rotor blade, and bonded where their bonding flanges (49, 50, 57, 60) meet. Depending on the structural needs of the rotor blade all sides can be cored (55, 56, 58, 59) or single skin (57, 60). As mentioned in FIG. 2, FIG. 3, FIG. 4, FIG. 5, and FIG. 6 the secondary shear web(s) CC2 will share common geometric qualities in that each will have 3 sides, and taper opposite the opening, forming a bonding flange (57, 60) at its apex. The opening may be open or capped 33 depending on the aerodynamic needs of the rotor blade. The (LP) trailing edge spar cap (61, 62) has been altered to allow the shear web(s) to be made integral with the (LP) side EE. By having the shear web(s)s (CC, CC2) integrated into the skin of both sides, the bonding flange is moved to the neutral axis (where the separate webs join) of the shear web(s). The neutral axis of the shear web(s) experiences less stress forces and is better suited for a secondary mechanical bond.

Figure 8:
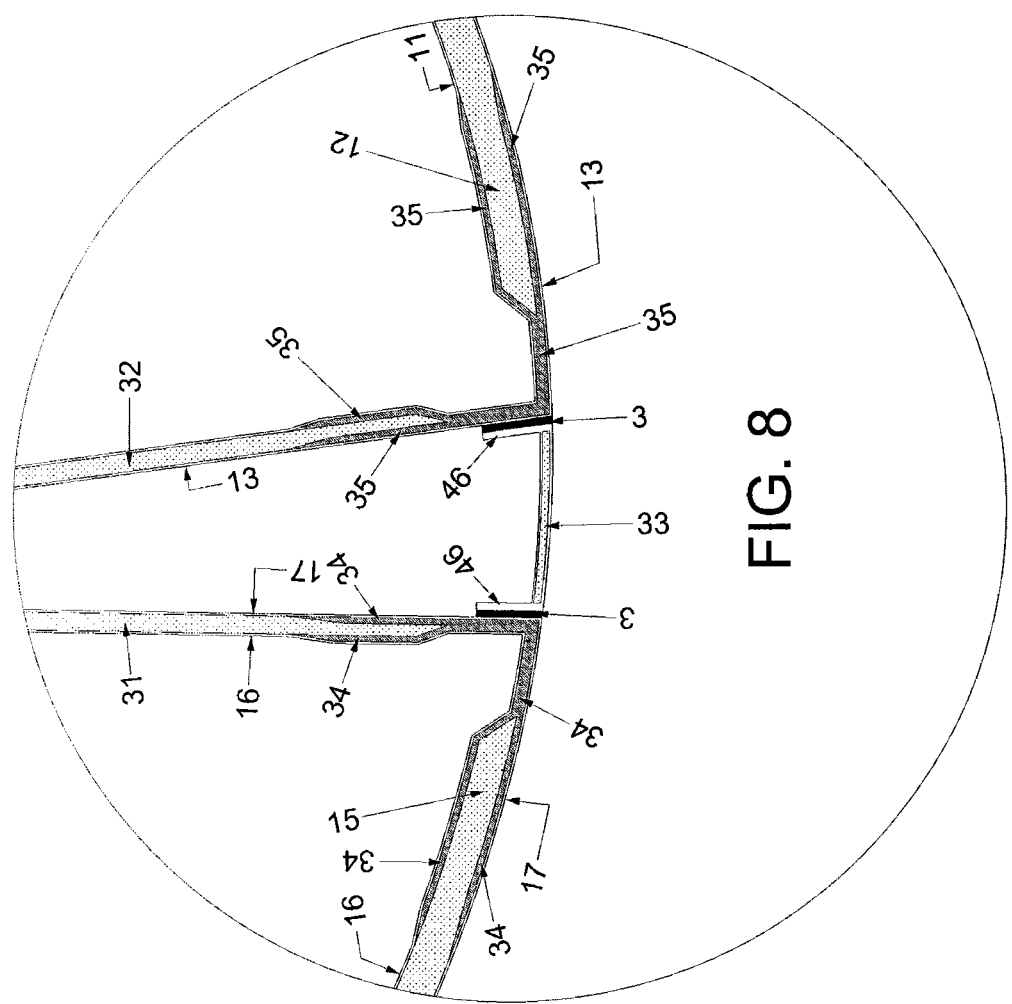
FIG. 8 presents a fragmentary detail view of the interface between the integrated shear web(s), integrated spar cap, and the shell of the rotor blade of FIG. 1 and FIG. 2.

FIG. 8 presents a detail view of the interface between the integrated shear web(s) (CC,CC2), integrated spar cap (34, 35) and the shell (EE,DD) of the rotor blade of FIG. 2. Note how the shear web(s) CC shares the inside and outside skins (11,13,16,17) of the shell it is integrated into. This particular view shows a method for laying in the spar cap (34,35) and tapering it out onto the adjoining surfaces. The spar cap material 34, 35 is one-piece and integral to both the skin and shear web. This is more common with smaller blades as the spar cap thickness is relatively thin. The detail demonstrates the compatibility of the integrated shear web(s) with current accepted build practices. The covering plate 33 in this detail is shown as cored (but could be single skin if necessary) with inward facing bonding flanges 46. This same detail can be used for smaller rotor blades utilizing the shear web(s)s described in FIG. 6, and FIG. 7. Depending on the size of the opening and the aerodynamic needs of the rotor blade this opening at the base of the shear web(s) may be left open.

Figure 9:
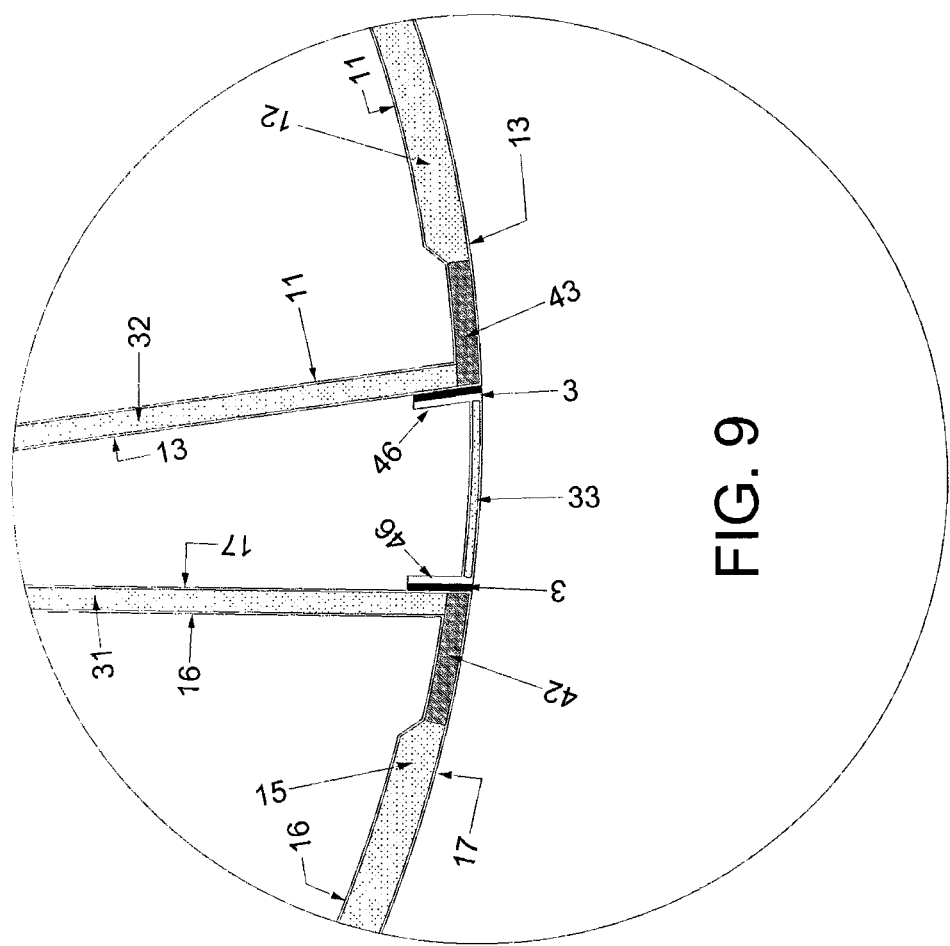
FIG. 9 presents a fragmentary detail view of the interface between the integrated shear web(s), spar cap, and the shell of the rotor blade of FIG. 3 and FIG. 4.

FIG. 9 presents a detail view of the interface between the integrated shear web(s)(CC,CC2), spar cap, and the shell of the rotor blade of FIG. 4 and FIG. 5. Note how the shear web(s) CC shares the inside and outside skins (11,13,16,17) of the shell it is integrated into. This particular view shows a method for laying in the spar cap (42,43) that was pre-made on a separate mold, and incorporated into the rest of the rotor blade assembly. This is a method by which large rotor blades, with thick spar caps can be manufactured. The detail demonstrates the compatibility of the integrated shear web(s) with current accepted build practices. The covering plate 33 in this detail is shown as cored (but could be single skin if necessary) with inward facing bonding flanges 46. Depending on the size of the opening and the aerodynamic needs of the rotor blade this opening at the base of the shear web(s) may be left open.

Figure 10:
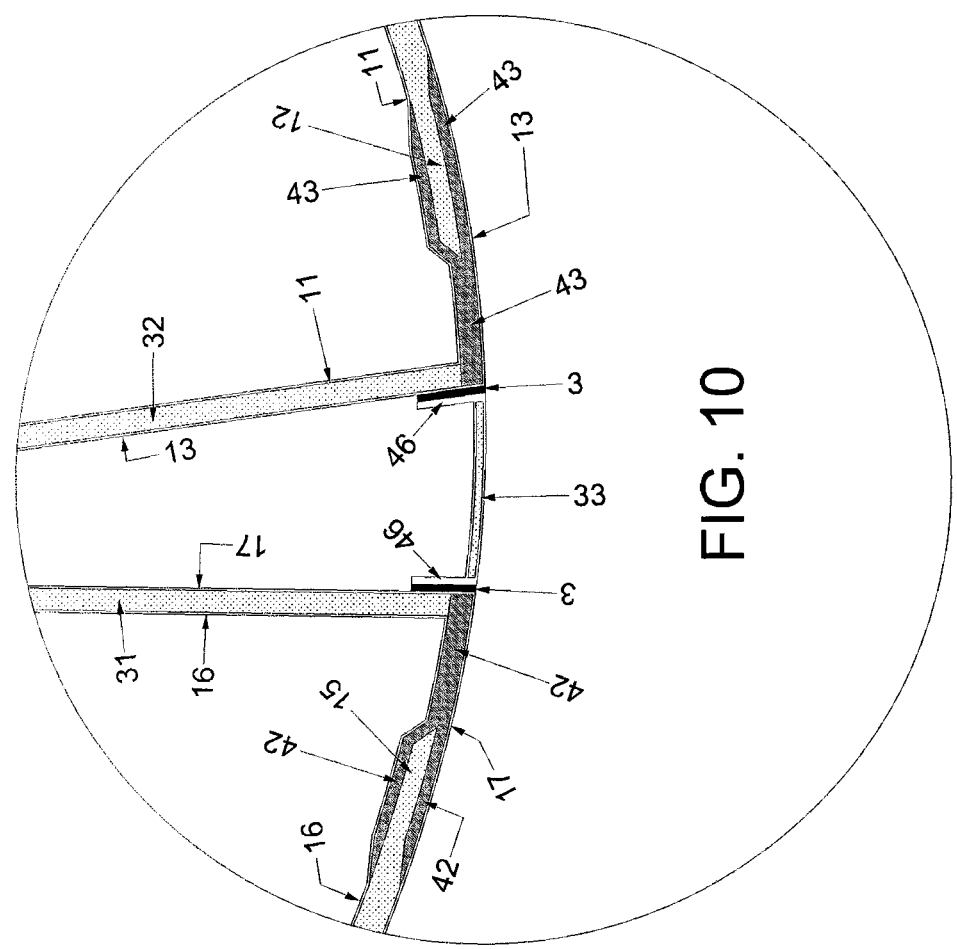
FIG. 10 presents a fragmentary detail view of another option for integrating a spar cap with the shear web(s), and how that interfaces with the integrated shear web(s) and the shell of the rotor blade.

FIG. 10 presents a detail view of another option for an integrated spar cap (42,43) with the shear web(s) (CC,CC2), and how that interfaces with the integrated shear web(s) (CC,CC2) and the shell of the rotor blade. This option can be used for FIG. 2, FIG. 3, FIG. 4, FIG. 5, FIG. 6, and FIG. 7. In this version of an integrated spar cap, the spar cap (42,43) laminates are tapered into the rotor blade shell (EE,DD) and not the shear web. This is a method by which small rotor blades, with thin spar caps (42,43) can be manufactured. The detail demonstrates the compatibility of the integrated shear web(s) with current accepted build practices. The covering plate 33 in this detail is shown as cored (but could be single skin if necessary) with inward facing bonding flanges 46. Depending on the size of the opening and the aerodynamic needs of the rotor blade this opening at the base of the shear web(s) may be left open. Note the transition of the skins 16, 17 and 11, 13 between the shell and shear web members.

Figure 11:
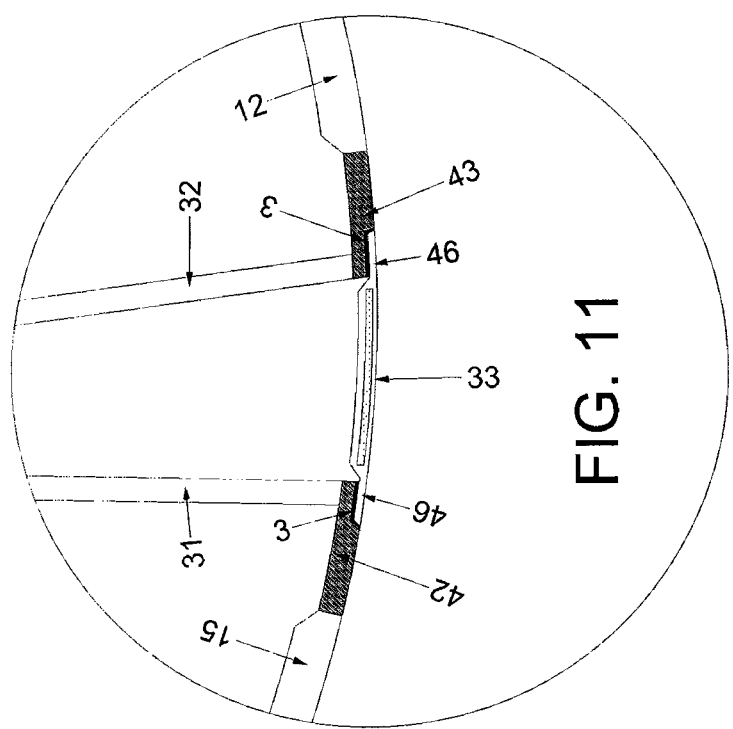
FIG. 11 presents a fragmentary detail view of an alternate type of cover plate and how it interfaces with the shell, the spar cap, and the integral shear web(s)

FIG. 11 presents a detail view of an alternate type of cover plate 33 and how it interfaces with the shell (EE,DD), the spar caps (42,43), and the integral shear web(s) (CC,CC2). This cover plate 33, is bonded into a recess provided in the shell (EE,DD) with bonding flanges 46 that are normal to the surface of the cover plate 33. This type of detail can be used for FIG. 4, FIG. 5, FIG. 6, and FIG. 7. The cover plate shown is cored construction, but can be single skin depending on the structural requirements of the rotor blade.

Figure 12:
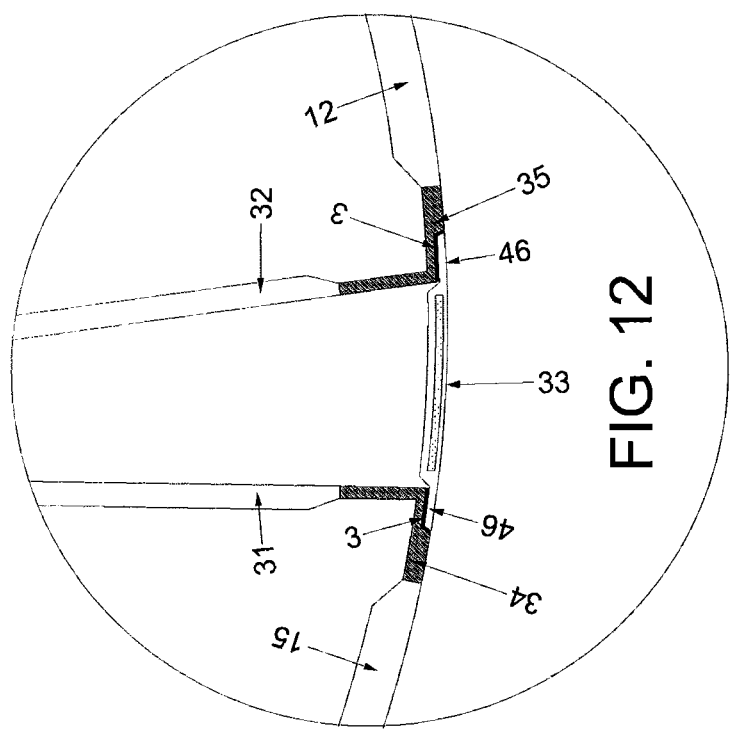
FIG. 12 presents a fragmentary detail view of an alternate type of cover plate and how it interfaces with the shell, the spar cap, and the integral shear web(s)
Figure 13:
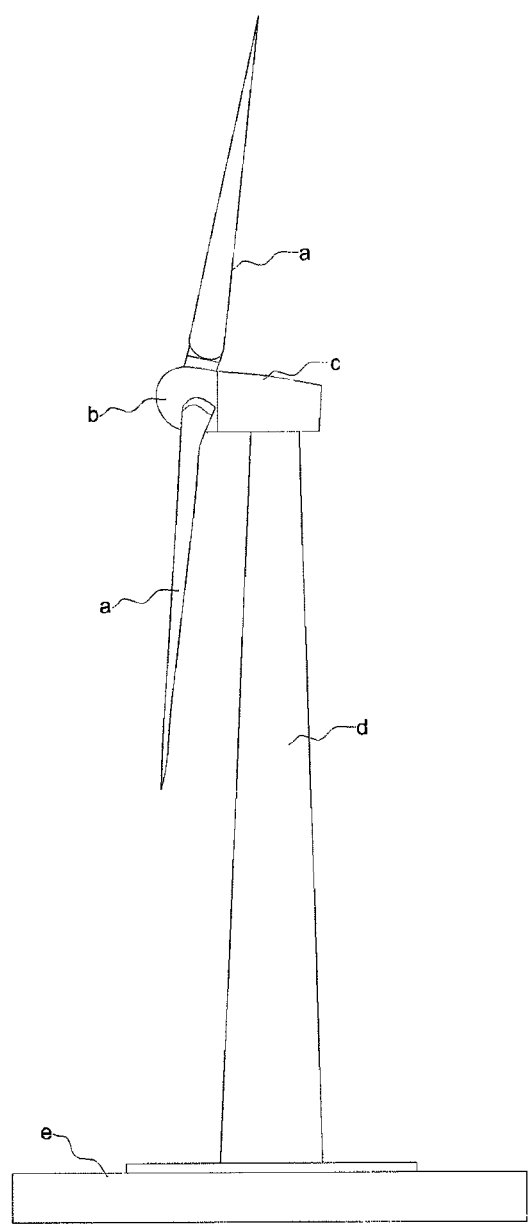
FIG. 13 presents a typical complete wind turbine assembly with 3 rotor blades a, a common hub b which secures the rotor blades to the nacelle c, which houses the generator and all applicable machinery and electronics that controls the wind turbine. The nacelle is attached to the tower d, which is secured to the ground by the base e.

FIG. 12 presents a detail view of an alternate type of cover plate and how it interfaces with the shell (EE,DD), the spar cap (34,35) and the integral shear web(s) (CC,CC2). This cover plate 33, is bonded into a recess provided in the shell (EE,DD) with bonding flanges 46 that are normal to the surface of the cover plate 33. This type of detail can be used for FIG. 2, FIG. 3. The cover plate shown is cored construction, but can be single skin depending on the structural requirements of the rotor blade.

FIG. 14 presents the production steps in constructing the integrated shear web turbine in accordance with the concepts of the present invention. This sequence shown in FIG. 14 is for one of the versions shown in the drawings herein, it being understood that other mold types can be used depending upon the structure being formed such as structures shown in FIGS. 2-7. In this series of drawings each phase of construction is illustrated. First, the outer skins (1,17) are laid into the molds, followed by the core (4,7,15,12), and then the inner skins (5,8,11,16). The laminates (skins and core) are then allowed to cure (if hand laid with wet material either prepreg or hand wetting) or infused. The mold halves are then closed and bonded together with the shear web(s). This sequence is for an embodiment wherein the shear web is only integral with one of the shells.

Now, with further reference to FIG. 14 it is noted that the mold itself has, for one of the mold halves, an integral piece P to be used for forming the shear web member. For the next three steps 2-4 there is illustrated the draping of the respective outside skin; core material; and inside skin. By using a mold part with an integral piece P, all of the laminations are arranged so that the formed shear web member at M is formed as the various laminations are draped into the mold. Next, in the process is to provide for a bonding step as the mold is closed. This involves applying a bonding material so that the other end of the shear web member has, for example, a bonding flange for securing the other end of the shear web member to the shell when the mold is closed. An industrial adhesive may be applied to the non-integral side of the shear web member which will be set in place as the mold is closed assuring that there is a bond between the non-integral side of the shear web member and the opposed shell. For an embodiment as shown in FIGS. 6 and 7, in the process steps of FIG. 14 there would be a piece P associated with both shells so that the shear web member is formed in separate sections that are each integrally formed with a respective shell member. In that case the aforementioned adhesive is applied between the shear web members as in the example of FIG. 6 at 3.

Thus, in accordance with the present invention, regarding the process for constructing the wind turbine blade, this constructs the blade in the form of an airfoil shape. The process steps are comprised of, providing a two part mold (see FIG. 14), providing a first pressure member or shell having a partial air foil shape and for disposition in one part of the mold, and providing a second pressure member or shell that also has a partial air foil shape and is for disposition in another part of the mold. Next is providing a shear web member having one and other ends and meant to bridge across the pressure members spanning a length of the pressure members, forming the one end of the shear web member integrally with an inner surface of the one pressure member, the other end of the shear web member having a bonding flange, or the like for securing the other end of the shear web member to the other pressure member when the mold is closed. The bonding flange is one of many ways that a structure can be provided that enables an adhesive to be applied to the non-integral side of the shear web member. At the same time the shell members are also bonded together such as at their leading edge HH and at their trailing edge II.

Other aspects of the process of the present invention wherein the step of providing a first pressure member for disposition in one part of the mold includes draping, in succession, an outside skin, a core material, and an inside skin; wherein the step of providing a second pressure member for disposition in another part of the mold includes draping, in succession, an outside skin, a core material, and an inside skin; wherein the skin is constructed of a fiber reinforced plastic material and the core is constructed of a foam or balsa material; wherein the shear web member is comprised of a pair of shear web members that are disposed in a side-by side arrangement; wherein the shear web member is of elongated construction and the respective elongated shear members taper inwardly away from the one end of each shear member; including two separated pairs of shear web members that are disposed in a side-by side arrangement and spaced along each pressure member, and wherein the one pressure member is a high pressure member and the other pressure member is a low pressure member; and wherein the pair of shear web members are formed as a first pair of elongated shear web element integrally formed with the one pressure member and a second pair of elongated shear web element integrally formed with the other pressure member.

REFERENCE LEGEND BELOW

AA: WIND TURBINE ROTOR BLADE SPAN (LENGTH)
BB: ROOT END
CC: SHEAR WEB
CC2: SECONDARY SHEAR WEB
DD: (HP) SIDE
EE: (LP) SIDE
FF: CHORD (WIDTH)
GG: TIP END
HH: LEADING EDGE
II: TRAILING EDGE
1: LEADING EDGE, (LP) OUTER SKIN
2: (LP), LEADING EDGE, BONDING FLANGE
3: ADHESIVE
4: LEADING EDGE, (LP), CORED (SANDWICH) MEMBER
5: LEADING EDGE, (LP) INNER SKIN
6: (LP) SPAR CAP
7: TRAILING EDGE, (LP), CORED (SANDWICH) MEMBER
8: TRAILING EDGE, (LP), INNER SKIN
9: TRAILING EDGE, (LP), OUTER SKIN
10: TRAILING EDGE BONDING FLANGE
11: TRAILING EDGE, (HP), INNER SKIN
12: TRAILING EDGE, (HP), CORED (SANDWICH) MEMBER
13: TRAILING EDGE, (HP), OUTER SKIN
14: (HP) SPAR CAP
15: LEADING EDGE, (HP), CORED (SANDWICH) MEMBER
16: LEADING EDGE, (HP), INNER SKIN
17: LEADING EDGE, (HP), OUTER SKIN
18: (HP), LEADING EDGE, BONDING FLANGE
19: SHEAR WEB INNER SKIN
20: SHEAR WEB CORED (SANDWICH) MEMBER
21: SHEAR WEB OUTER SKIN
22: SHEAR WEB, (HP), BONDING FLANGE SINGLE SKIN
23: SHEAR WEB, (LP), BONDING FLANGE SINGLE SKIN
24: TRAILING EDGE SHEAR WEB, (LP) BONDING FLANGE SINGLE SKIN
25: TRAILING EDGE SHEAR WEB INNER SKIN
26: TRAILING EDGE SHEAR WEB CORED (SANDWICH) MEMBER
27: TRAILING EDGE SHEAR WEB OUTER SKIN
28: TRAILING EDGE SHEAR WEB (HP) BONDING FLANGE
29: TRAILING EDGE, (LP) SPAR CAP
30: TRAILING EDGE, (HP) SPAR CAP
31: INTEGRATED MAIN SHEAR WEB LEADING EDGE CORED (SANDWICH) MEMBER
32: INTEGRATED MAIN SHEAR WEB TRAILING EDGE CORED (SANDWICH) MEMBER
33: CAPPING PLATE
34: LEADING EDGE, (HP) INTEGRAL SPAR CAP
35: TRAILING EDGE, (HP) INTEGRAL SPAR CAP
36: INTEGRATED SHEAR WEB BONDING FLANGE SINGLE SKIN
37: INTEGRATED TRAILING EDGE SHEAR WEB, LEADING EDGE CORED (SANDWICH) MEMBER
38: INTEGRATED TRAILING EDGE SHEAR WEB, TRAILING EDGE CORED (SANDWICH) MEMBER
39: (HP), SECONDARY, INTEGRAL TRAILING EDGE SPAR CAP
40: (HP), SECONDARY, INTEGRAL LEADING EDGE SPAR CAP
41: INTEGRATED TRAILING EDGE SHEAR WEB, (LP) BONDING FLANGE SINGLE SKIN
42: (HP), MAIN LEADING EDGE SPAR CAP
43: (HP), MAIN TRAILING EDGE SPAR CAP
44: (HP), SECONDARY LEADING EDGE SPAR CAP
45: (HP), SECONDARY TRAILING EDGE SPAR CAP
46: CAPPINING PLATE BONDING FLANGE SINGLE SKIN
47: INTEGRATED (HP) SIDE MAIN SHEAR WEB LEADING EDGE CORED (SANDWICH) MEMBER
48: INTEGRATED (HP) SIDE MAIN SHEAR WEB TRAILING EDGE CORED (SANDWICH) MEMBER
49: (HP) MAIN SHEAR WEB BONDING FLANGE SINGLE SKIN
50: (LP) MAIN SHEAR WEB BONDING FLANGE SINGLE SKIN
51: INTEGRATED (LP) SIDE MAIN SHEAR WEB TRAILING EDGE CORED (SANDWICH) MEMBER
52: INTEGRATED (LP) SIDE MAIN SHEAR WEB LEADING EDGE CORED (SANDWICH) MEMBER
53: (LP) MAIN LEADING EDGE SPAR CAP
54: (LP) MAIN TRAILING EDGE SPAR CAP

55: INTEGRATED (HP) SIDE TRAILING EDGE SHEAR WEB, LEADING EDGE CORED (SANDWICH) MEMBER
56: INTEGRATED (HP) SIDE TRAILING EDGE SHEAR WEB, TRAILING EDGE CORED (SANDWICH) MEMBER
57: (HP) SIDE TRAILING EDGE SHEAR WEB BONDING FLANGE SINGLE SKIN
58: INTEGRATED (LP) SIDE TRAILING EDGE SHEAR WEB, LEADING EDGE CORED (SANDWICH) MEMBER
59: INTEGRATED (LP) SIDE TRAILING EDGE SHEAR WEB, TRAILING EDGE CORED (SANDWICH) MEMBER
60: INTEGRATED (LP) SIDE TRAILING EDGE SHEAR WEB BONDING FLANGE SINGLE SKIN
61: (LP) SECONDARY LEADING EDGE SPAR CAP
62: (LP) SECONDARY TRAILING EDGE SPAR CAP

Having now described a limited number of embodiments of the present invention, it should now be apparent to those skilled in the art that numerous other embodiments and modifications thereof are contemplated as falling within the scope of the present invention, as defined by the appended claims.

What is claimed:

1. A wind turbine rotor blade comprising:
a first pressure member and a second pressure member that together are interconnected to form an airfoil, the first pressure member having an opening defined therein, and
a shear web member that is constructed and arranged to span across the pressure members, said shear web member having a first side, a second side and a third side, said second side disposed between said first and third side with said first and third sides tapered towards said second side, said shear web member having opposite respective first and second ends,
a first end of the shear web member including at least one spar cap that is integrally formed with the first pressure member at said opening, the second end of the shear web member including a bonding flange for securing the second end of the shear web member to the second pressure member at a location therealong; and
said shear web member is one of two separate shear web members, said shear web members disposed in a side-by side arrangement and spaced along each pressure member, and wherein the first pressure member is a high pressure member and the second pressure member is a low pressure member.

2. The wind turbine rotor blade of claim 1 wherein said shear web member is comprised of a single shear web member that is comprised of a core material and inner and outer shells.

3. The wind turbine rotor blade of claim 2 wherein the single shear web member is integrated into both pressure members.

4. The wind turbine rotor blade of claim 1 further including a bonding material for securing the bonding flange with the second pressure member.

5. The wind turbine rotor blade of claim 1 wherein each shear web member includes an inner skin and an outer skin encapsulating a core material.

6. The wind turbine rotor blade of claim 5 wherein the core material is comprised of one of a foam material and a balsa material.

7. The wind turbine rotor blade of claim 1 wherein each shear web member is of elongated construction and the respective elongated shear web members taper inwardly toward the second end of each shear web member.

8. The wind turbine rotor blade of claim 1 wherein each shear web member is formed as a first pair of elongated shear web portions integrally formed with the first pressure member and a second pair of elongated shear web portions integrally formed with the second pressure member.

9. The wind turbine rotor blade of claim 8 including a bonding flange at both elongated shear web portions and a bonding material for joining the bonding flanges.

10. A method of manufacturing a wind turbine rotor blade comprising,
providing a two part mold,
providing a first pressure member having a partial air foil shape in a first part of the mold, the first pressure member having an opening defined therein,
providing a second pressure member having a partial air foil shape in a second part of the mold,
providing a shear web member having first and second ends bridging across the pressure members spanning a length of the pressure members, said shear web member having a first side, a second side and a third side, said second side disposed between said first and third side with said first and third sides tapered towards said second side, and
forming the first end of the shear web member integrally with an inner surface of the first pressure member at the opening, the second end of the shear web member having a bonding flange for securing the second end of the shear web member to the second pressure member when the mold is closed; and
said shear web member is one of two separate shear web members that are disposed in a side-by side arrangement and spaced along each pressure member, and wherein the first pressure member is a high pressure member and the second pressure member is a low pressure member.

11. The method of manufacturing a wind turbine rotor blade of claim 10, wherein providing a first pressure member in a first part of the mold includes draping, in succession, an outside skin, a core material, and an inside skin.

12. The method of manufacturing a wind turbine rotor blade of claim 11 wherein providing a second pressure member in a second part of the mold includes draping, in succession, an outside skin, a core material, and an inside skin.

13. The method of manufacturing a wind turbine rotor blade of claim 12 wherein the skin is constructed of a fiber reinforced plastic material and a core is constructed of a foam or balsa material.

14. The method of manufacturing a wind turbine rotor blade of claim 12 wherein at least one shear web member is of elongated construction and the first and third sides taper evenly inwardly from the first end of the shear member.

15. The method of manufacturing a wind turbine rotor blade of claim 12 wherein each shear web member is formed as a first pair of elongated shear web portions integrally formed with the first pressure member and a second pair of elongated shear web portions integrally formed with the second pressure member.

* * * * *